United States Patent [19]

De Medio

[11] Patent Number: 5,634,350

[45] Date of Patent: Jun. 3, 1997

[54] REFRIGERATION SYSTEM

[75] Inventor: Flavio De Medio, Collegno, Italy

[73] Assignee: Microtecnica S.P.A., Turin, Italy

[21] Appl. No.: 530,414

[22] Filed: Sep. 19, 1995

[30] Foreign Application Priority Data

Sep. 20, 1994 [IT] Italy ................... TO94A0727

[51] Int. Cl.$^6$ ............................................ F25B 41/00
[52] U.S. Cl. .................. 62/217; 62/205; 62/510; 62/509
[58] Field of Search ................ 62/196.4, 217, 62/205, 206, 510, 505, 197, 509

[56] References Cited

U.S. PATENT DOCUMENTS

| | | | |
|---|---|---|---|
| 2,897,659 | 8/1959 | Wergner | 62/510 X |
| 3,568,466 | 3/1971 | Brandin et al. | 62/510 |
| 3,698,204 | 10/1972 | Schlotterbeck et al. | 62/217 X |
| 3,808,835 | 5/1974 | Weatherston | 62/510 |
| 3,962,884 | 6/1976 | Widdowson | 62/217 |
| 4,364,238 | 12/1982 | Huelle et al. | 62/217 |
| 5,056,329 | 10/1991 | Wilkinson | 62/510 X |
| 5,063,750 | 11/1991 | Englund | 62/510 X |
| 5,182,920 | 2/1993 | Matsuoka et al. | 62/217 X |

*Primary Examiner*—Harry B. Tanner
*Attorney, Agent, or Firm*—Armstrong, Westerman, Hattori, McLeland & Naughton

[57] ABSTRACT

A refrigeration system, particularly for controlling the temperature of an environment, and presenting a compressor; a condenser; a laminating thermostatic valve; an evaporator; an evaporation pressure control valve interposed between the outlet of the evaporator and an inlet of the compressor; an economizer in turn presenting a laminating orifice downstream from the condenser, and a flash tank with an inlet communicating with the orifice, a liquid-phase outlet connected to the thermostatic valve, and a gaseous-phase outlet connected to an intermediate inlet of the compressor; and a tapping valve interposed between the outlet of the compressor and the flash tank, and which is opened when the pressure in the flash tank falls below a predetermined threshold value.

6 Claims, 2 Drawing Sheets

REFRIGERATION SYSTEM

BACKGROUND OF THE INVENTION

The present invention relates to a refrigeration system, and particularly, though not exclusively, to a refrigeration system forming part of a system for controlling the temperature of an aircraft compartment.

As is known, refrigeration systems basically comprise a compressor, a condenser, an orifice, and an evaporator series-connected to one another to form a closed circuit. The compressor is supplied with refrigerant in the form of low-pressure vapor, which it compresses to form a higher-pressure vapor at the outlet; the vapor is fed into the condenser where it is condensed by heat exchange with a lower-temperature fluid, typically air from outside the environment being temperature controlled; and the liquid from the condenser is fed through the laminating orifice, in which it is expanded, with no change in heat content, to reduce its pressure, and finally to the evaporator. This is a heat exchanger in which the refrigerant exchanges heat with the air inside the environment being temperature controlled; the liquid evaporates and draws heat from the environment; and the vapor from the evaporator is fed to the compressor, i.e. back to the start of the cycle.

The design of a refrigeration system poses two main problems, the relative importance of which depends on the type of application involved, and which are: controlling the temperature of the environment as accurately as possible in response to variations in external conditions; and achieving a high degree of efficiency of the system, i.e. minimizing the mechanical energy required to drive the compressor for a given amount of heat drawn from the environment at a given temperature.

The first problem is solved more or less successfully in various ways.

In less sophisticated applications, such as household refrigerators, a straightforward on-off compressor control is used, which is turned on and off when the temperature inside the refrigerator reaches an upper and lower threshold value, respectively, so that the temperature varies continually between the two threshold values.

In applications involving a variation in the load of the evaporator, a servovalve is sometimes used to control evaporation pressure.

As regards the efficiency problem, some refrigeration systems comprise a so-called economizer for increasing the enthalpy variation at the evaporator for a given capacity of the compressor, and which substantially comprises a second orifice immediately downstream from the condenser for evaporating part of the refrigerant, and a flash tank with an inlet communicating with the second orifice, a liquid-phase outlet connected to the evaporator by the first orifice, and a gaseous-phase outlet connected to an intermediate inlet of the compressor.

The extra mechanical energy required for compressing the fluid withdrawn by the flash tank from the heat exchange in the evaporator is far less than the extra heat drawn from the environment by increasing the enthalpy variation at the evaporator; and the efficiency of the compressor is improved by the inter-refrigeration produced by introducing cold vapor from the flash tank.

To improve both refrigeration efficiency and temperature control, the most logical step would appear to be a combination of the above two solutions (economizer and evaporation pressure control). Unfortunately, however, in certain conditions, operation of the economizer results in disabling of the evaporation pressure control function. That is, the fall in pressure at the inlet of the compressor produced by operation of the evaporation pressure control valve results in a fall in pressure at the intermediate stage of the compressor, so that more vapor is drawn from the flash tank, and the pressure inside the tank is reduced. Being connected to the evaporator, the tank therefore also affects the evaporation pressure, thus making control by the valve pointless.

SUMMARY OF THE INVENTION

It is an object of the present invention to provide a refrigeration system designed to simultaneously improve refrigeration efficiency and temperature control.

According to the present invention, there is provided a refrigeration system comprising means for compressing a refrigerant; a condenser connected to the outlet of said compressing means; a first orifice; and an evaporator presenting an inlet connected to said first, and an outlet connected to an inlet of said compressing means; characterized in that it comprises, in combination:

an evaporation pressure control valve interposed between said outlet of said evaporator and said inlet of said compressing means;

an economizer, in turn comprising a second orifice connected to the outlet of said condenser; and a flash tank presenting an inlet connected to said second orifice, a liquid-phase outlet connected to said first orifice, and a gaseous-phase outlet connected to an intermediate inlet of said compressing means; and tapping means for connecting said outlet of said compressing means to said flash tank.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
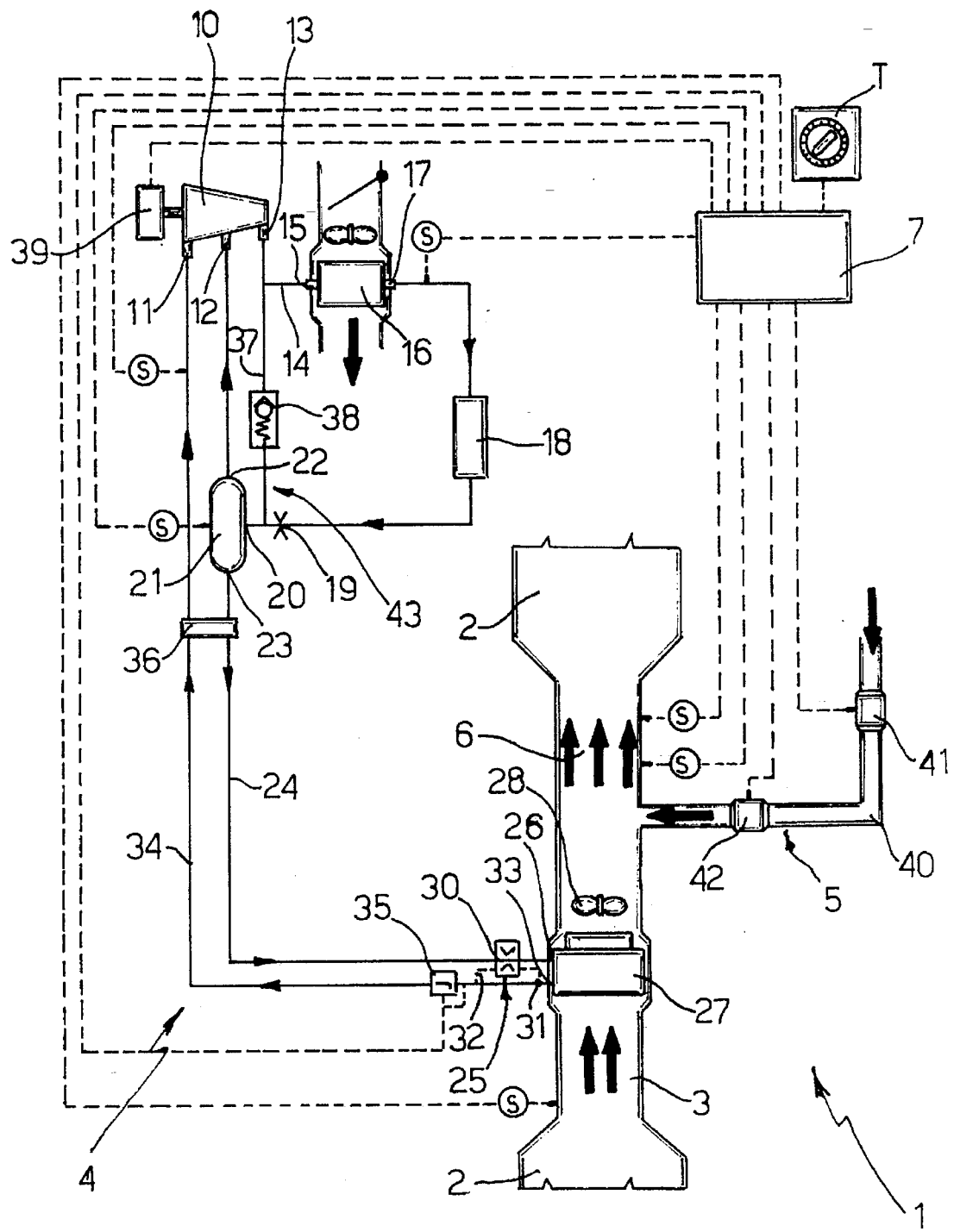
FIG. 1 shows a circuit diagram of a system for controlling the temperature inside the passenger compartment of an aircraft and featuring a refrigeration circuit in accordance with the teachings of the present invention.

Number 1 in FIG. 1 indicates a system for controlling the temperature of the passenger compartment 2 of an aircraft.

System 1 substantially comprises a conduit 3 for drawing air from compartment 2; a vapor refrigeration system 4 for cooling the air drawn from the compartment; a device 5 for drawing hot air from an engine compressor of the aircraft (not shown); and a conduit 6 for feeding air cooled by system 4 and/or hot air from device 5 into the compartment. System 1 also comprises an electronic control unit 7 for controlling system 4 and device 5 on the basis of input signals received from a temperature selector T and from sensors S connected to the system and to compartment 2 and indicating the operating conditions of the system.

System 4 employs a refrigerant such as hydrofluorocarbon HFC-134a, and comprises a compressor 10—conveniently a continuous compression compressor known as a scroll compressor in which the pressure of the refrigerant increases in a continuous manner between an inlet valve and an outlet valve —with an inlet 11, an intermediate inlet 12 communicating with an intermediate compression stage, and an outlet 13. Outlet 13 is connected by a conduit 14 to the inlet 15 of a condenser 16 comprising a heat exchanger between the refrigerant and the air outside the aircraft. The outlet 17 of condenser 16 is connected, via a filter 18, to a laminating orifice 19 for partly evaporating the liquid, and which is connected to the inlet 20 of a flash tank 21 presenting a gaseous-phase outlet 22 connected to intermediate inlet 12 of compressor 10, and a liquid-phase outlet 23.

Orifice 19 and tank 21 form part of a known economizer 43.

The liquid-phase outlet 23 of tank 21 is connected by a conduit 24 to a known thermostatic valve 25 with a pressure equalizer and, in turn, connected to the inlet 26 of an evaporator 27 substantially comprising a heat exchanger between the refrigerant and the air drawn from compartment 2 along conduit 3. By means of a fan 28 downstream from evaporator 27, the air is forced along conduit 6 into compartment 2.

Thermostatic valve 25 incorporates, in known manner, a laminating orifice 30 with a variable section, which is adjusted automatically to maintain a positive difference of a few ° C. between the temperature of the vapor from the evaporator, detected by the valve by means of bulb 31, and the saturation temperature of the vapor at the output pressure from the evaporator, which is also detected by the valve by means of a drive line 32 communicating with outlet 33 of evaporator 27. The design of valve 25, and, more specifically, the way in which the section of laminating orifice 30 is adjusted according to the temperature and pressure of the vapor from evaporator 27, is known and therefore not described in detail.

The outlet 33 of evaporator 27 is connected by a conduit 34 to inlet 11 of compressor 10.

Conduit 34 is fitted with a solenoid valve 35 for regulating the evaporation pressure, and which is controlled by unit 7 as a function of the thermal load in compartment 2.

System 4 also comprises a heat exchanger 36 for undercooling the liquid in conduit 24 and so preventing thermostatic valve 25 from being supplied with a two-phase mixture. In actual fact, as opposed to comprising an actual device, exchanger 36 simply represents schematically the heat exchange occurring between conduits 24 and 34 which are conveniently placed adjacent to and contacting each other.

Outlet 13 of compressor 10 is connected to inlet 20 of flash tank 21 by a conduit 37 fitted with a known hot-gas tapping valve 38, which is normally closed, and is opened when the pressure downstream, i.e. in tank 21, falls below a given minimum threshold value, to feed hot vapor from the outlet of the compressor into the tank.

Compressor 10 is driven by an engine of the aircraft (not shown) via a transmission (not shown) to which it is selectively connected by an electric clutch 39 controlled by unit 7.

Hot-air tapping device 5 substantially comprises a conduit 40 for feeding hot air into conduit 6; and a pair of solenoid valves 41, 42 fitted in series to conduit 40 and activated by control unit 7. Solenoid valve 41 is a two-position on-off type for fully closing conduit 40 when hot air supply to compartment 2 is not required; and solenoid valve 42 is adjusted continuously for regulating the supply of hot air to compartment 2.

Depending on the thermal load of compartment 2, system 1 operates in three ways. When the temperature in compartment 2 is high, solenoid valve 41 is closed, thus cutting off the hot air supply, so that only refrigeration system 4 is operative. Conversely, when the temperature in compartment 2 falls below a given threshold value, system 4 is disabled and only hot air is supplied. An intermediate condition may occur, however, wherein refrigeration system 4, in the presence of a very low thermal load, tends to overcool the compartment, in which case, device 5 is also activated simultaneously, so that the compartment is supplied with a mixture of cold air from system 4 and hot air from device 5.

Figure 2:
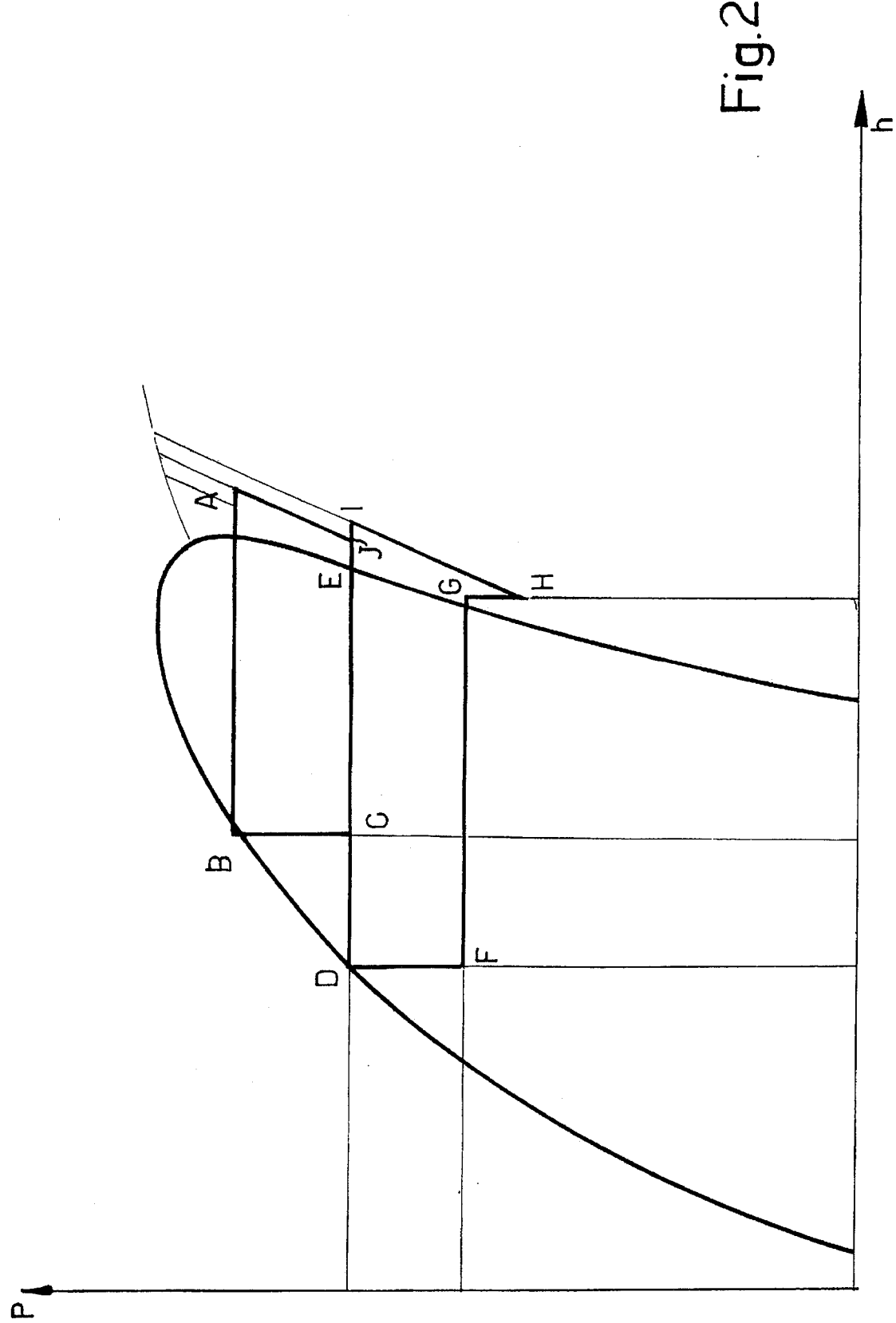
FIG. 2 shows a pressure/specific heat content graph of the refrigeration cycle of the FIG. 1 system.

Operation of system 4 will now be described with reference to the attached pressure (p)/specific heat content (h) graph (FIG. 2), and commencing, for the sake of simplicity, from the end of the compression stage (point A in the graph) at which the refrigerant is in the form of superheated vapor compressed at maximum cycle pressure. Leaving aside, for the time being, any hot gas tapped by valve 38, the vapor is condensed in the condenser and gives off heat to the outside air; and the liquid so formed (point B), which is slightly undercooled and still substantially at maximum pressure, is subjected to a first isenthalpic expansion through laminating orifice 19 to reduce the temperature and partly evaporate the liquid: the pressure and vapor strength of the two-phase mixture entering tank 21 are shown by point C in the graph.

The liquid and gaseous phases in the tank are at the thermodynamic state defined respectively by points D and E which are the intersection of the saturation curve and the isobar through point C.

The liquid phase, slightly undercooled in exchanger 36, flows through thermostatic valve 25 in which it is subjected to a second isenthalpic expansion to the evaporation pressure (point F) which depends on the operating point of regulating valve 35. The evaporator provides for fully evaporating the refrigerant (point G) which absorbs heat from the air drawn from the compartment along conduit 3; and the cooled air is fed back into the compartment along conduit 6.

The vapor from the evaporator undergoes a further load loss through regulating valve 35 to fall to the minimum circuit pressure (point H), and is superheated slightly by exchanger 36 before reaching inlet 11 of compressor 10. For the sake of simplicity, the effect of exchanger 36 is not taken into account in the FIG. 2 graph.

In compressor 10, the vapor is compressed continuously with substantially no variation in heat; and, at an intermediate compression stage at which the pressure is close to that in flash tank 21 (point I), the compressor is supplied through intermediate inlet 12 with saturated vapor from tank 21, the thermodynamic state of which is defined by point E. Compression therefore continues as of point J between points E and I —the location of point J along segment EI depending on the supply ratio from the first compression stage and tank 21—and terminates at cycle-start point A.

In the event valve 35, to achieve a given evaporation pressure, results in a low pressure value at inlet 11, and hence intermediate inlet 12, of compressor 10, a larger quantity of fluid is drawn from flash tank 21, so that, in the absence of any corrective measures, the pressure in the tank would fall and, since evaporator 27 is connected to the tank, would also affect the evaporation pressure value. According to the present invention, however, upon the pressure in the flash tank falling to a given minimum threshold value, tapping valve 38 is opened to draw pressurized hot vapor from the outlet of the compressor into the tank.

As such, the pressure in the flash tank is stabilized to a given minimum value, to enable the evaporation pressure to be regulated effectively by valve 35 in any operating condition of system 4.

The advantages of the refrigeration system according to the present invention will be clear from the foregoing description.

In particular, combined use of economizer 43 and evaporation pressure control valve 35 provides for achieving a high degree of efficiency of the system and, at the same time, accurate temperature control, and is made possible by tapping vapor from the outlet of the compressor into the flash tank to prevent the pressure in the tank from falling and so preventing control of the evaporation pressure by valve 35.

Clearly, changes may be made to system 1, and particularly system 4, as described and illustrated herein without, however, departing from the scope of the present invention.

In particular, system 4 may be used in any commercial application, even other than an air conditioning system; and the scroll compressor may be replaced by any other type.

I claim:

1. A system for controlling the temperature of an environment including a refrigeration system (4) having means (10) for compressing a refrigerant; a condenser (16) connected to the outlet (13) of said compressing means (10); a first orifice (25); an evaporator (27) having an inlet (26) connected to said first orifice (25), and an outlet (33) connected to an inlet (11) of said compressing means (10); characterized in that said refrigeration system comprises, in combination:

an evaporation pressure control valve (35) interposed between said outlet (33) of said evaporator (27) and said inlet (11) of said compressing means (10);

an economizer (43) having a second orifice (19) connected to the outlet (17) of said condenser (16); and a flash tank (21) having an inlet (20) connected to said second orifice (19), a liquid-phase outlet (23) connected to said first orifice (25), and a gaseous-phase outlet (22) connected to an intermediate inlet (12) of said compressing means (10); and tapping means (37, 38) connecting said outlet (13) of said compressing means (10) to said inlet (20) of said flash tank (21).

2. A system as claimed in claim 1, characterized in that said tapping means comprise a valve (38) which is opened when the pressure in said flash tank (21) falls below a predetermined minimum threshold value.

3. A system as claimed in claim 1, characterized in that said compressing means comprise a continuous compression compressor (10).

4. A system as claimed in claim 3, characterized in that said compressor (10) is a scroll compressor.

5. A system for controlling the temperature of an environment (2) as claimed in claim 1, and characterized further in that it comprises means (5) for feeding hot air into said environment.

6. A system for controlling the temperature of an environment (2) as claimed in claim 5, characterized in that it further comprises a unit (7) for controlling said refrigeration system (4) and said means (5) for feeding hot air into said environment (2) on the basis of input signals indicating the operating conditions of the system (1).

* * * * *

UNITED STATES PATENT AND TRADEMARK OFFICE
CERTIFICATE OF CORRECTION

PATENT NO.:    5,634,350
DATED      :   June 3, 1997
INVENTOR(S):   Flavio DE MEDIO It is certified that error appears in the above-identified patent and that said Letters Patent is hereby corrected as shown below:

On the title page:

In item [73] the assignee, the city is in error. Please change "Microtecnia S.P.A., Turin, Italy" to be --Microtecnia S.P.A., Torino, Italy--.

Signed and Sealed this

Ninth Day of June, 1998

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,634,350
DATED : June 3, 1997
INVENTOR(S) : Flavio De Medio

It is certified that error appears in the above-identified patent and that said Letters Patent is hereby corrected as shown below:

On the title page, in item [73] the assignee, "Microtecnia S.P.A., Torino, Italy" as it is stated on the previous Certificate of Correction should be --Microtecnica S.P.A., Torino, Italy--.

This certificate supersedes Certificate of Correction issued June 9, 1998.

Signed and Sealed this

Twenty-first Day of December, 1999

Attest:

Q. TODD DICKINSON

*Attesting Officer*  *Acting Commissioner of Patents and Trademarks*